1,678,104

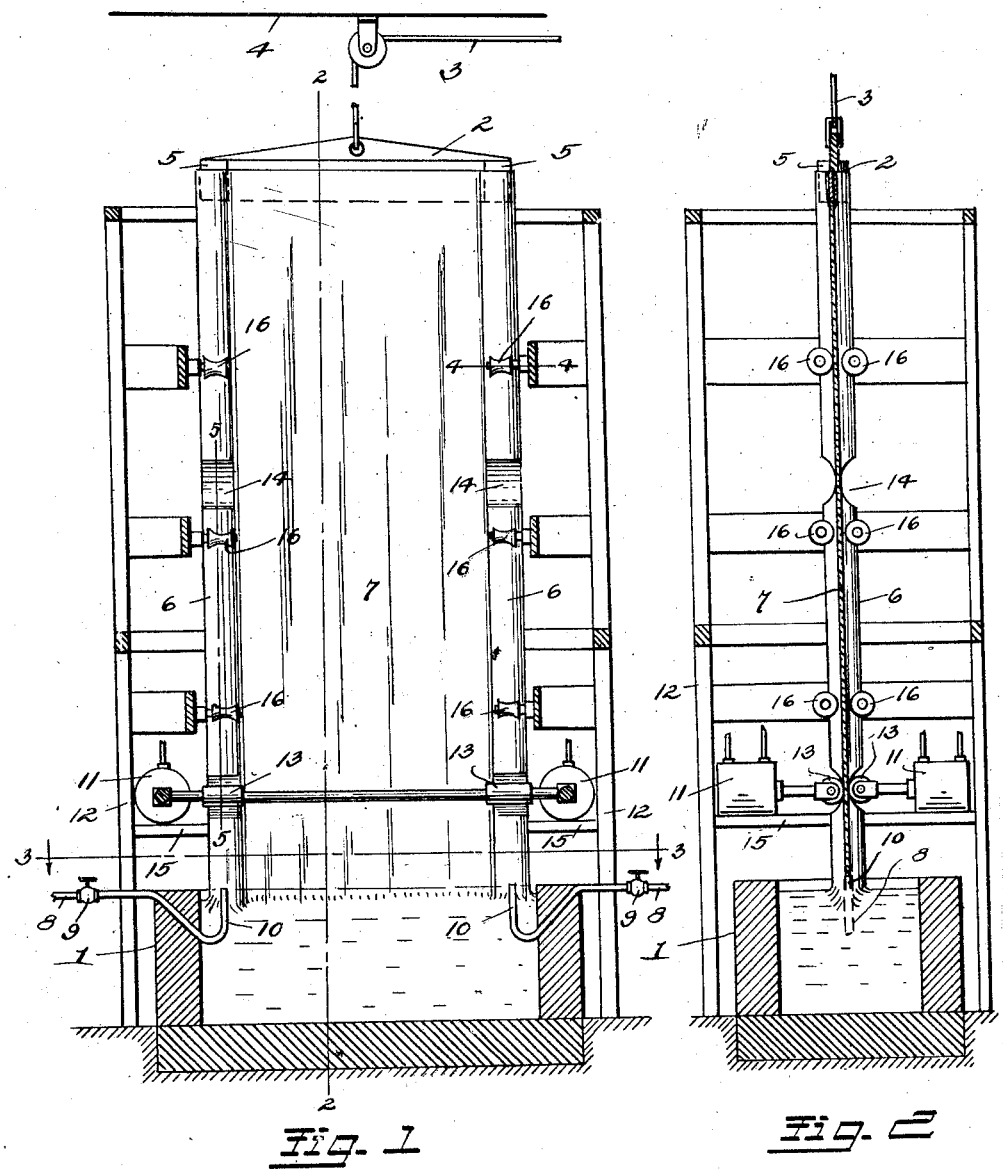

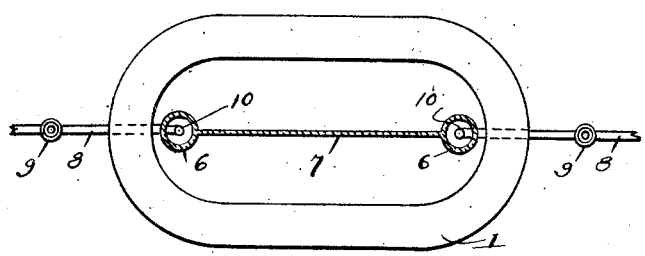
Fig. 3
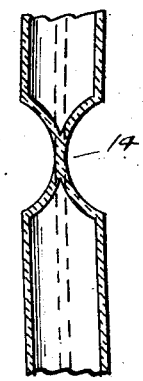
Fig. 5
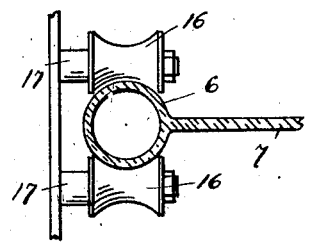
Fig. 4
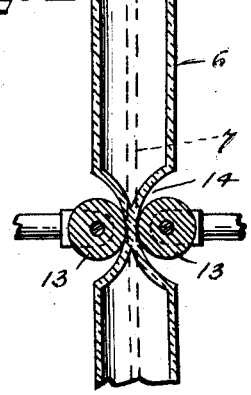
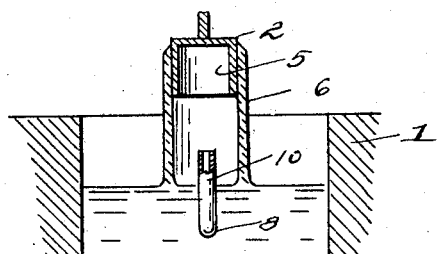
Fig. 6
Inventor
R. F. Cole
By W. S. McDowell
Attorney Patented July 24, 1928.

UNITED STATES PATENT OFFICE.

RAUL F. COLE, OF MOUNT VERNON, OHIO.

APPARATUS FOR DRAWING SHEET GLASS.

Application filed November 12, 1926. Serial No. 148,064.

This invention relates to improvements in the art of producing sheet glass, and has for a primary object the provision of apparatus by which glass may be drawn upwardly in sheet formation from a furnace containing glass in a molten state and wherein improved means are provided, operating on the sheet while the latter is cooling and contracting and serving to positively prevent warping or bending of the glass sheet so that the final product will present smooth, plane and flat sides, and be void of such irregularities and defects that have been largely present in flat drawn glass.

Another object of the invention resides in the provision of apparatus of the character indicated, by means of which air or other fluid is introduced into the glass sheets as the latter are being withdrawn from the glass vat, the introduction of the air being accomplished in such a manner as to produce hollow vertical edges in the glass sheet as the latter is being drawn upwardly by the associated bait. means have been provided for closing the hollow edges at intervals to confine the air therein and to permit sheets of desired length to be cut off at the top of the operation.

A further object resides in the provision of means situated to engage the enlarged vertical edges of the glass sheet and acting thereon to hold the flat body of the glass, lying between the enlarged edges, rigid and substantially taut, so that the glass upon cooling and contracting will not be permitted to distort and bend, so that glass of good optical and clear light transmitting and reflecting properties will be produced.

With these and other objects in view, as will appear as the description proceeds, the invention consists in the novel features of construction, combinations of elements and arrangements of parts hereinafter to be fully described and pointed out in the appended claims.

In the accompanying drawing:

Figure 1 is a fragmentary view in vertical section disclosing the improved glass drawing apparatus comprising the present invention, Figure 2 is a vertical sectional view taken on the plane indicated by the line 2—2 of Figure 1.

Figure 3 is a horizontal sectional view on the line 3—3 of Figure 1,

Figure 4 is a similar view taken on the plane indicated by the line 4—4 of Figure 1, Figure 5 is an enlarged vertical sectional view on the line 5—5 of Figure 1, Figure 6 is a detail sectional view disclosing the glass sheet as it is being drawn from the molten glass contained in the furnace and illustrating particularly the process of forming one of the hollow edges on the glass sheet.

Referring more particularly to the drawings the numeral 1 designates the drawing pot of a glass furnace. It will be understood that the furnace can be of any suitable type and that the molten glass will be maintained at the desired level in the drawing pot. Disposed above the open top of the pot 1 is a vertically travelling bait 2, which is suspended suitably by means of a cable 3, or the equivalent, from an overhead support 4. The bait is adapted to be lowered in the usual manner to engage with the molten glass in the pot 1 and is of such form that when elevated the glass adhering thereto will be withdrawn from the pot in sheet formation. As shown especially in Figures 1 and 6 the ends of the bait are enlarged as at 5 to produce corresponding enlargements in the form of hollow circular edges 6 on the sheet like body of glass 7 withdrawn from the furnace. In this instance the setting of the furnace has provided therein air admitting pipes 8, valve regulated as at 9, and terminated in short upstanding vertical sections 10, which are disposed in registration with the enlarged end of the bait and are adapted to be positioned above the level of the molten glass in the furnace and to project into the hollow edges 6 of the glass sheet under process of formation. It will be seen that by introducing air under pressure into the edges 6 the latter will be maintained in their hollow, cylindrical form and prevented from unduly collapsing.

As the sheet is drawn upwardly from the surface of the molten glass it is desirable to close the edges 6 at longitudinal or vertically spaced intervals, in order that the glass may be subsequently cut into sheets of desired length without permitting of the release of the air confined within said edges. A preferred construction for accomplishing this result consists in the provision of a pair of air cylinders 11, supported by a frame structure 12. Slidable piston rods project outwardly from said cylinders and have their outer ends equipped with rollers 13, operating on the cylindrical edges of the glass from opposite sides thereof. It will be seen, by reference to Figures 2 and 5, that the rollers 13, when moved together, impinge upon the edges 6 and force the latter together at intervals, as indicated at 14 so as to seal said edges and to thereby retain the air therein when the latter are subsequently cut at the time of the operation. Each of the cylinders 11 contains a piston which may be operated by air pressure against the resistance of a spring to force the rollers outwardly or forwardly into engagement with the glass. This operation can be substantially instantaneously performed and therefore will not interfere with the upward travel of the glass sheet, although if desired, the cylinders may be mounted on a sliding carriage 15, carried by the frame structure so as to travel upwardly in unison and at the same speed with the glass body.

In addition to the reinforcement and strength given the glass body by the cylindrical vertical edges thereof the present invention also provides means exerting a positive action on the hollow edges to prevent the flat glass body 7 from warping and bending when cooling and contracting. This mechanism has been shown in Figures 1 and 4 especially and in the present instance comprises at each side of the frame structure a plurality of spool shaped rollers 16, which are revolubly mounted on horizontal studs 17 projecting from the frame structure, the rollers being shaped to engage the opposite convex sides of the glass edges so as to positively guide the glass in an upward direction and are positioned on said edges in such manner that the glass body 7 will be prevented from buckling and bending while cooling. After being removed from the frame structure the glass is cut in the usual manner into sheets of appropriate lengths.

In view of the foregoing it will be seen that the present invention provides apparatus for drawing sheet glass from a furnace in such manner as to produce hollow, air filled cylindrical edges on the glass as the latter is being drawn upwardly by the base from the furnace. These edges serve to reinforce the glass and to preserve the uniform width of the glass sheet as it is being drawn upwardly, overcoming any tendency to buckle or bend while contracting while cooling. This feature is further insured by the inclusion of the means such as the spools 16, which positively engage the cylindrical edges and hold the sheet in true vertical alignment.

What is claimed is:

1. In glass drawing apparatus for producing flat glass sheets, a furnace containing a body of molten glass, an elongated bait vertically movable with respect to said furnace for drawing flat glass sheets therefrom, said bait being provided at the ends thereof with cylindrical enlargements, for producing enlarged cylindrical edges on the glass sheets produced thereby, means for introducing a gaseous fluid into the cylindrical edges as the latter are being formed by the upward movement of the bait, and means operating upon said edges to hermetically seal the fluid within said edges at intervals throughout the length of the sheet.

2. In apparatus for drawing flat glass sheets, a furnace containing a body of molten glass, a vertically travelling bait formed to produce hollow cylindrical edges in the glass sheets drawn from said furnace during the upward movement of the bait, means for introducing a gaseous fluid into said edges, and means for sealing the fluid at intervals in said edges.

3. In apparatus for drawing flat glass sheets, a glass furnace, a bait of elongated formation movable vertically with respect to said furnace to draw glass therefrom in the form of substantially flat sheets, said bait being provided with enlarged end portions to produce enlarged hollow edges along the vertical sides of the glass sheets drawn from the furnace, means for introducing a fluid into said edges to maintain the form thereof, and means operating intermittently to compress said edges at intervals to seal the fluid therein.

4. In a machine for drawing glass, a furnace containing a body of molten glass, a bait travelling vertically with relation to said furnace and shaped to produce glass of flat sheet like formation, said bait being also formed to produce cylindrical hollow edges on the glass sheets as the latter arise from said furnace, means for introducing a gaseous fluid into said edges to preserve the form thereof, pressure means acting intermittently to flatten said edges at intervals throughout the length thereof to seal the fluid therein, and means engaging with said edges to maintain the vertical alignment thereof during the upward movement of said bait and to overcome the tendency of the glass to buckle and bend during cooling and contraction.

In testimony whereof I affix my signature.

RAUL F. COLE.